United States Patent
Finkbeiner et al.

(10) Patent No.: US 8,134,258 B2
(45) Date of Patent: Mar. 13, 2012

(54) ELECTRICAL DIRECT LINEAR DRIVE DEVICE WITH A STATOR HAVING TWO GUIDE RAILS FOR THE LINEAR GUIDANCE OF A DRIVEN CARRIAGE

(75) Inventors: Matthias Finkbeiner, Motzingen (DE); Tom Unger, Rechberghausen (DE)

(73) Assignee: Festo AG & Co. KG, Esslingen (DE)

( * ) Notice: Subject to any disclaimer, the term of this patent is extended or adjusted under 35 U.S.C. 154(b) by 300 days.

(21) Appl. No.: 12/598,990

(22) PCT Filed: Sep. 20, 2007

(86) PCT No.: PCT/EP2007/008170
§ 371 (c)(1),
(2), (4) Date: Nov. 5, 2009

(87) PCT Pub. No.: WO2009/039865
PCT Pub. Date: Apr. 2, 2009

(65) Prior Publication Data
US 2010/0133925 A1    Jun. 3, 2010

(51) Int. Cl.
*H02K 41/03* (2006.01)
(52) U.S. Cl. .................................................. 310/12.31
(58) Field of Classification Search ............... 310/12.09, 310/12.11, 12.27, 12.31; 335/222, 229
See application file for complete search history.

(56) References Cited

U.S. PATENT DOCUMENTS

| | | | |
|---|---|---|---|
| 5,731,641 A * | 3/1998 | Botos et al. | 310/12.6 |
| 6,191,507 B1 * | 2/2001 | Peltier et al. | 310/12.2 |
| 6,573,623 B2 * | 6/2003 | Tsuboi et al. | 310/12.19 |
| 7,109,610 B2 * | 9/2006 | Tamai | 310/12.19 |
| 7,239,049 B2 * | 7/2007 | Miyamoto | 310/12.1 |
| 7,498,700 B2 * | 3/2009 | Ohno | 310/12.22 |
| 7,683,749 B2 * | 3/2010 | Yajima et al. | 335/222 |
| 2003/0205445 A1 | 11/2003 | Kuwabara | |
| 2005/0140213 A1 * | 6/2005 | Miyamoto et al. | 310/12 |
| 2006/0049700 A1 * | 3/2006 | Moriyama | 310/12 |

FOREIGN PATENT DOCUMENTS

| | | |
|---|---|---|
| DE | 4301434 | 7/1994 |
| DE | 29807438 U1 | 9/1998 |
| GB | 2176722 A | 1/1987 |
| GB | 2179279 A | 3/1987 |
| GB | 2194907 | 3/1998 |
| WO | WO 2004100342 | 11/2004 |

* cited by examiner

*Primary Examiner* — Tran Nguyen
(74) *Attorney, Agent, or Firm* — Hoffmann & Baron, LLP

(57) ABSTRACT

An electrical direct linear drive device, with a stator (10) having two guide rails (12, 13) for the linear guidance of a driven carriage (11) is proposed, wherein a permanent magnet arrangement (18) providing the electrical drive, and a drive coil arrangement (19), which is movable relatively thereto, are provided. The guide rails (12, 13) are arranged on sides (14, 15) of the stator (10) which are differently oriented, wherein the carriage (11) extends at least partially over each one of these sides (14, 15). Guide elements having guide channels for the guide rails (12, 13) are arranged on the carriage (11).

17 Claims, 6 Drawing Sheets

ELECTRICAL DIRECT LINEAR DRIVE DEVICE WITH A STATOR HAVING TWO GUIDE RAILS FOR THE LINEAR GUIDANCE OF A DRIVEN CARRIAGE

This application claims priority based on an International Application filed under the Patent Cooperation Treaty, PCT/EP2007/008170, filed Sep. 20, 2007.

BACKGROUND OF THE INVENTION

The invention relates to an electrical direct linear drive device.

In connection with such a direct linear drive device known from DE 298 07 438 U1, two guide rails are arranged on one side of the stator in an essentially identical plane. One of the guide rails is used only as a support for compensating tolerances and heat expansions, and the associated guide element of the carriage can be freely displaced transversely to the linear guidance direction. Although the heat expansion of the carriage, which becomes heated when operated, no longer plays a substantial role because of this, such an arrangement is only suitable for the horizontal seating of the carriage on the guide rails. No sufficient guidance of the carriage is assured in all other positions of the linear drive device.

SUMMARY OF THE INVENTION

One object of the present invention lies in providing a guide device with two rails, which is independent to a large extent of the spatial position of the direct linear drive device, but with which tolerances and heat expansions can be controlled to a sufficient degree.

In accordance with the invention, this object is attained by means of a direct linear drive device with a stator having two guide rails for the linear guidance of a driven carriage, wherein a permanent magnet arrangement providing the electrical drive and a drive coil arrangement, which is movable relatively thereto, are provided, and wherein the guide rails are arranged on sides of the stator which are differently oriented, and wherein the carriage extends at least partially over each one of these sides, and wherein guide elements having guide channels for the guide rails are arranged on the carriage.

By means of the arrangement of the guide rails, which are essentially arranged offset by 90° in respect to each other, more advantageous conditions regarding tolerances and heat expansion result, in which the direct linear drive device can assume a multitude of spatial positions. The carriage extends at least partially over two sides of the stator, so that by means of the two mounting faces of the carriage constituted by this a variable shaft structure and variably attachments, for example a drag chain or cooling body, can be realized. Moreover, multi-shaft systems are made possible by this arrangement.

Advantageous further developments and improvements of the direct linear drive device are possible.

In an advantageous manner, the carriage has an essentially L-shaped profile and in particular has two plate-shaped carriage areas arranged at right angles to each other, whose exterior surfaces can be used as mounting faces for the placement of attachments or for the variable fastening of the carriage on a base, where in the second case the stator constitutes the moving element.

In one embodiment of the invention, the carriage supports the drive coil arrangement on its side opposite the permanent magnet arrangement on the stator, while the reversed arrangement is also possible, i.e. in that case the carriage supports the permanent magnet arrangement and the stator the drive coil arrangement.

In an advantageous manner the stator, which in particular is embodied as an extruded profile or continuously cast profile, has adjustable fixation means for the guide rails, which preferably can be fixed in place in longitudinal grooves of the stator by means of adjustable sliding blocks. In this way the guidance element can be aligned in two planes and a two-dimensional alignment is made possible. In the process it is possible to compensate for manufacturing tolerances.

The carriage is guided on the guide rails by means of two, preferably three or four, guide elements, which cooperate in a positively connected manner with the guide rails in such a way that only a relative movement in the linear direction of the guide rails is possible. Because of this, the direct linear drive device can be mounted and operated in any desired spatial orientation. In this case the guide elements are preferably embodied in the form of revolving ball guide elements.

Tolerance fluctuations in regard to the angle assignment of the guide rails, or respectively the guide elements, can be advantageously compensated in that the guide elements are embodied so they can be fixed in place by means of curved angle compensating elements, or angle compensating areas, on correspondingly curved compensation surfaces or compensation recesses.

A perfect compensation of tolerances and heat expansions is achieved by means of a hinged carriage. To this end, the carriage advantageously has carriage areas which are connected with each other via a pivot shaft extending parallel with the guide rails, and to which the guide elements themselves are hingedly attached. It is possible by means of this to also compensate tolerances over the entire length of the stroke, even in the course of movement. In this case the carriage areas are embodied to be plate-shaped in order to form mounting areas in the same way as with a rigid embodiment. For a hinged installation of the guide elements, these are preferably fixed in place on holding elements, or holding plates, hingedly attached to the carriage areas.

For achieving a fixed angle of preferably 90° between the two mounting faces, which is to be maintained regardless of the heat expansion of the carriage, the first carriage area of the carriage, which can be acted upon by the driving force, is rigidly connected with a plate-like carriage area which is arranged at right angles to it and extends over the second carriage area, which is embodied to be of one or two pieces, or is arranged in essentially the same plane with it. In this case this plate-like carriage area constitutes a mounting area, whose angle in respect to the first carriage area, which also constitutes a mounting area, is always maintained, while angular changes between the first carriage area and the second carriage area have no effect on the mounting areas.

In an advantageous manner, a position measuring device for scanning position markings arranged along the stator is also arranged on the carriage and can, for example, have a sensor arrangement sensitive to a magnetic field, while the position markings are embodied as magnetic markings.

In an advantageous further development of the invention, a linear channel through the stator contains a piston, which is mechanically or magnetically connected with the carriage and can be designed as a drive piston or gravitation-compensating device.

In order to keep heat expansions as low as possible, in particular in connection with a rigid embodiment of the carriage, the carriage consists of a material with a low coefficient of heat expansion, for example steel, or a steel alloy, and/or of carbon-reinforced fiber and/or a corresponding compound material.

BRIEF DESCRIPTION OF THE DRAWINGS

Exemplary embodiments of the invention are represented in the drawings and will be explained in greater detail in the following description. Shown are in.

DETAILED DESCRIPTION OF THE INVENTION

Figure 1:
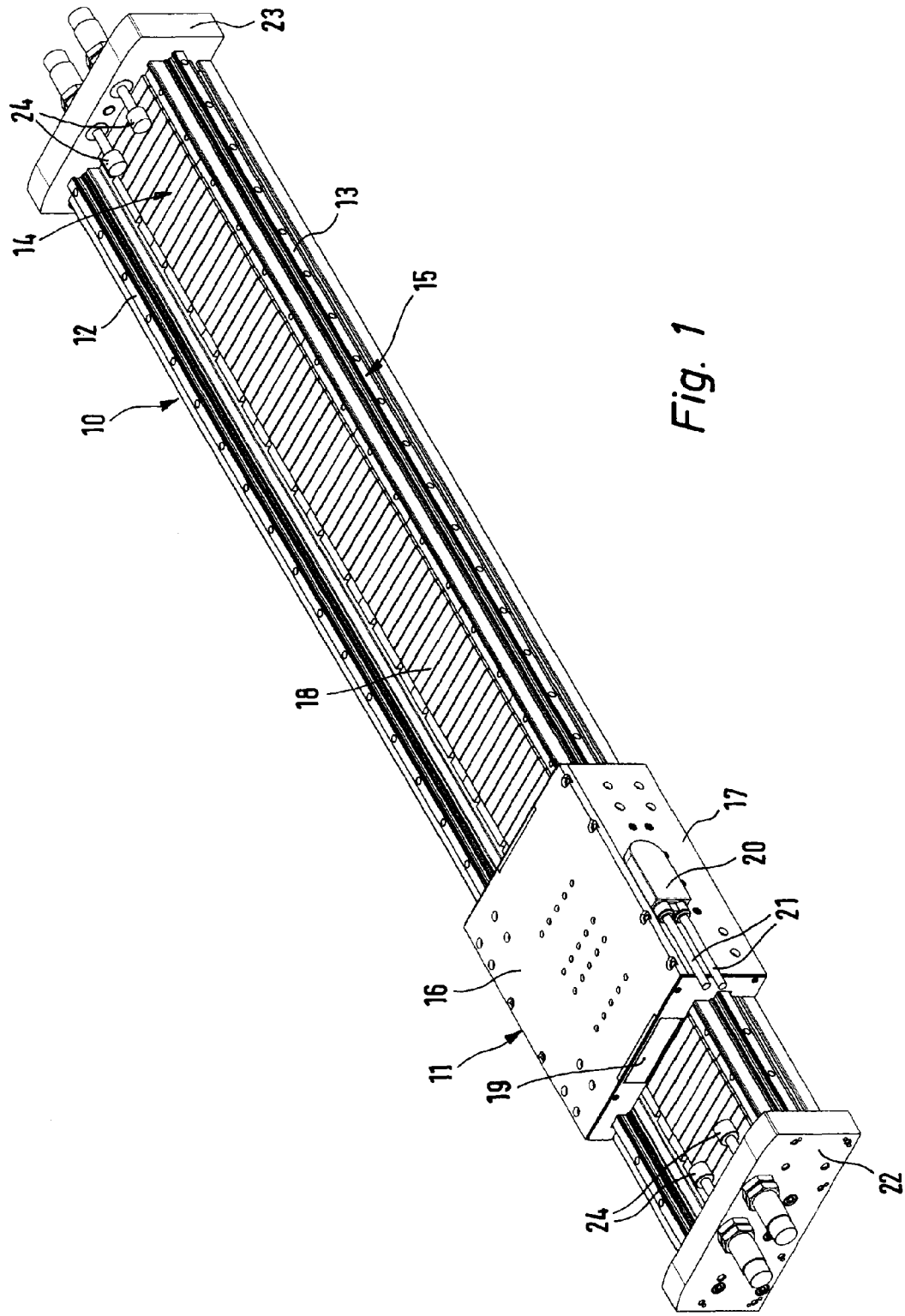
FIG. 1, a perspective representation of the electrical direct linear drive device as an exemplary embodiment of the invention, FIG. 2, a cross-sectional representation of the electrical direct linear drive device with a schematically represented, hingedly-embodied carriage, FIG. 3, a perspective plan view of the hingedly-embodied carriage, FIG. 4, a cross-sectional representation with a schematically represented, hingedly-embodied carriage, in which a rigid mounting plate extends over one carriage area, FIG. 5, a perspective representation of a rigidly embodied carriage, on whose inside four angle-compensation cutouts are arranged, FIG. 6, an enlarged representation of a guide rail fixed in place on the stator, around which a guide element extends, in a sectional representation, and FIG. 7, a corresponding representation, in which the guide element is embodied as a revolving ball guide element with a curved angle compensation element.

The electrical direct linear drive device represented in FIG. 1 has an oblong stator 10, along which a carriage 11 is movably guided. Two guide rails 12, 13, which have been arranged on adjoining, differently oriented sides of the stator, have been attached to the stator 10 for guiding the carriage 11, namely one of the guide rails, 12, on the top 14 of the stator 10 and the other guide rail 13 on one of the adjoining narrow sides, namely on the narrow side 15. In this case the guide rail 12 is attached to the edge area of the top 14 which is distant from the narrow side 15, so that the two guide rails 12, 13 are positioned as far apart from each other as possible. Since the top 14 essentially assumes an angle of 90° in regard to the narrow side 15, the guide rails 12, 13 are correspondingly offset by an angle of 90° in respect to each other. Accordingly, the carriage 11 has an L-shaped cross section, wherein the larger, plate-like leg constitutes a first carriage area 16 and extends over the top 14, while the smaller, plate-like leg constitutes a second carriage area 17 and extends over the narrow side 15. The two carriage areas 16, 17 are rigidly connected with each other, for example as one piece, and the carriage areas 16, 17 are arranged at right angles in relation to each other.

The carriage 11 is conducted on the guide rails 12, 13 by means of guide elements, not visible in FIG. 1, which are arranged on the insides of the carriage 11 and which will be described in greater detail in connection with the further drawing figures.

In a manner known per se, for one a permanent magnet arrangement 18 consisting of a plurality of permanent magnets lined up with each other and extending over the entire length of the stator 10 is employed for the electrical drive of the carriage 11, and on the other hand a drive coil arrangement 19 which works together with the former and is arranged on the inside of the first carriage area, but cannot be seen in FIG. 1 because of the perspective exterior view. It will be shown in connection with the subsequent drawing figures. Such a drive arrangement is for example known from the prior art recited at the outset.

For the excitation of the drive coil arrangement 19, the carriage 11 has an electrical connection arrangement 20 in the second carriage area 17, which is connected via supply lines 21 with an electrical control device, not represented. Since during its operation the carriage 11 is moving, the supply lines 21 must be appropriately carried along, for example by means of a drag chain. Alternatively to this, the connection arrangement 20 can also be provided at a different location, for example in the first carriage area 16.

A reversed arrangement is also possible in principle, i.e. the elongated drive coil arrangement is located on the stator 10, while the carriage 11 supports the permanent magnet arrangement.

On its two remote ends, the stator 10 is provided with cover plates 22, 23, which support end stop members 24 for the carriage 11. These end stop members 24 can also be designed as end stop dampers.

The flat outsides of the carriage areas 16, 17 visible in FIG. 1 are used as mounting faces for loads, or respectively installations, to be moved by means of the carriage 11, while other ancillary equipment, such as cooling bodies, electrical connection arrangements 20, drag chains, and the like, can be attached. Furthermore, these carriage areas 16, 17, the first carriage area 16 in particular, can be used for mounting the carriage 11 at a fastening point, in which case the stator 10 is moved relative to the carriage 11 and has, for example, a load, or respectively an object to be moved, at one or both ends.

Figure 2:
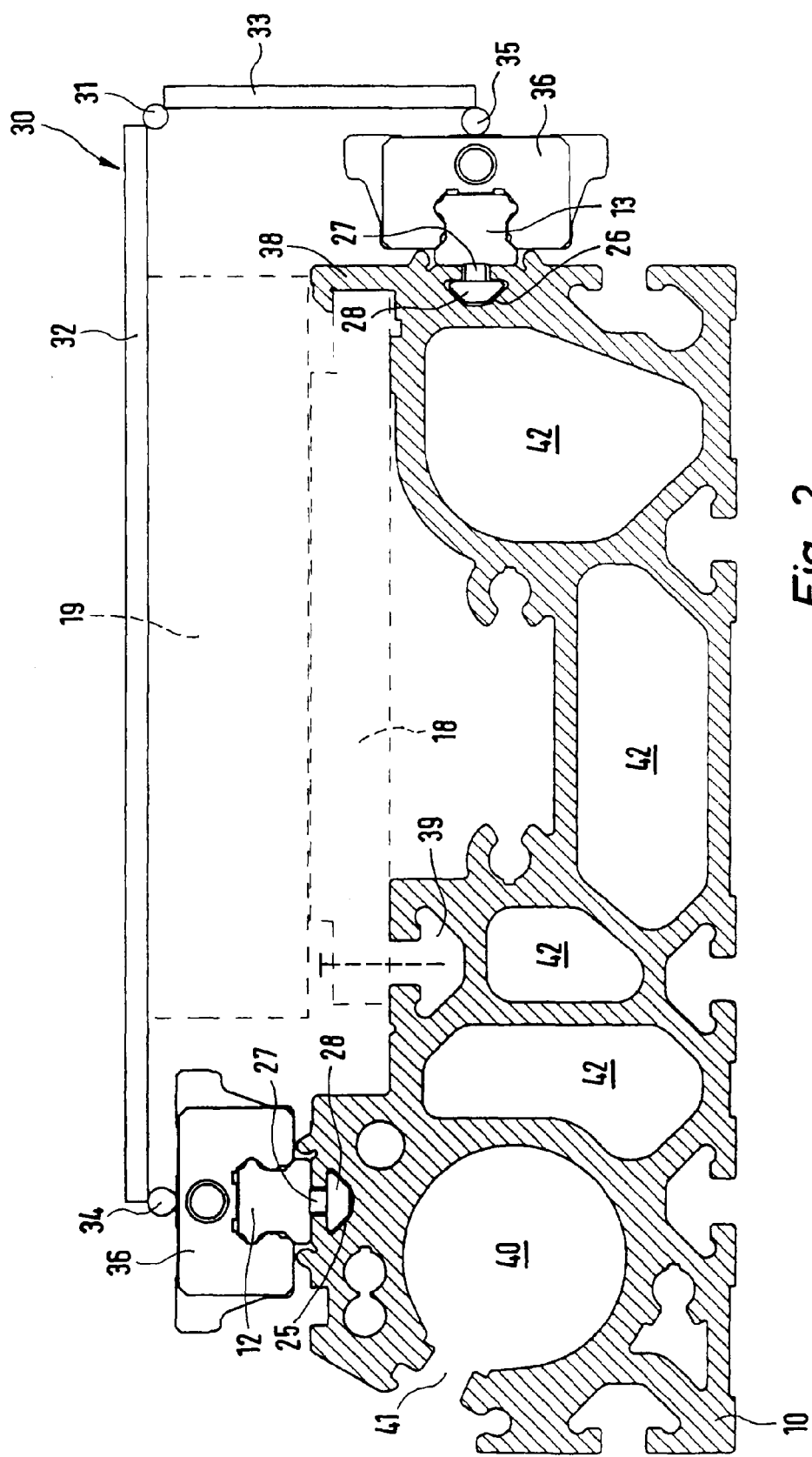
Figure 6:
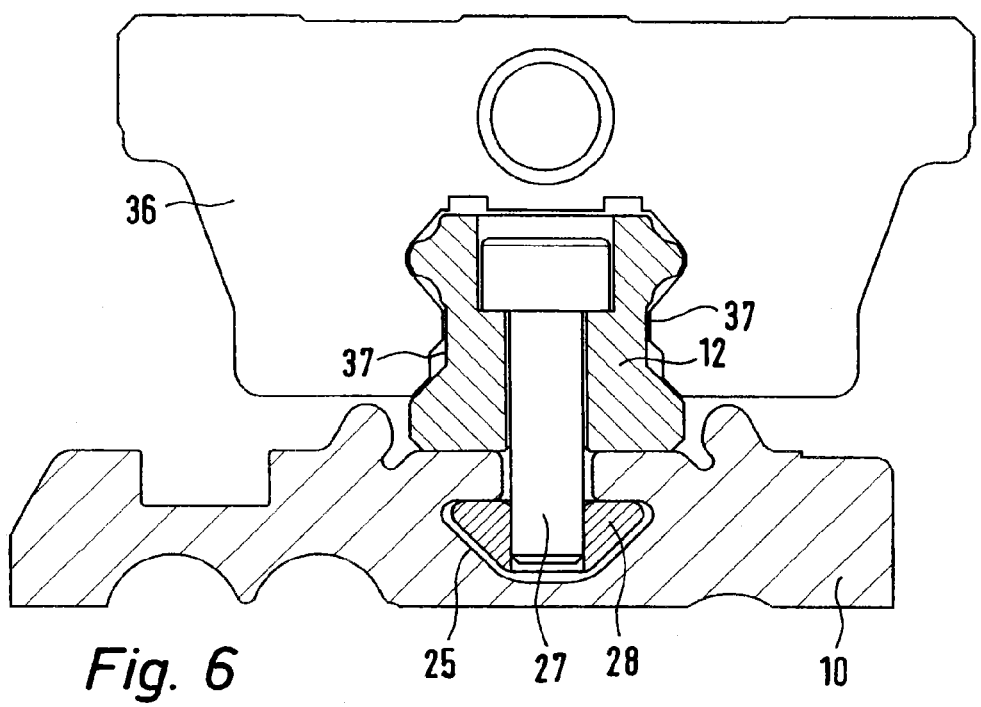

The stator 10 is represented in cross section in FIG. 2, it is embodied as an oblong profiled body, for example as a profiled extruded or cast part, and consists for example of aluminum or an aluminum alloy. For fixing the two guide rails 12, 13 in place, the stator 10 has respective longitudinal grooves 25, 26 on the top 14 and the narrow side 15 wherein, in accordance with the detailed representation in FIG. 6, the guide rails 12, 13 are fixed in place by means of holding screws 27, which are screwed together with sliding blocks 28 inserted into the longitudinal grooves 25, 26. Depending on the length of the guide rails 12, 13, a more or less large number of holding screws 27 and sliding blocks 28 is employed for this.

The sliding blocks 28 have a narrower profile in relation to the longitudinal grooves 25, 26, so that a certain adjustment of the guide rails 12, 13 for compensating manufacturing tolerances and other tolerances is made possible by means of the play between the sliding blocks 28 and the longitudinal grooves 25, 26. This is of particular importance in case of a rigid carriage 11 as represented in FIG. 1. Because of the possibility of adjustment, re-milling of the support faces for the guide rails 12, 13 is not required.

Figure 3:
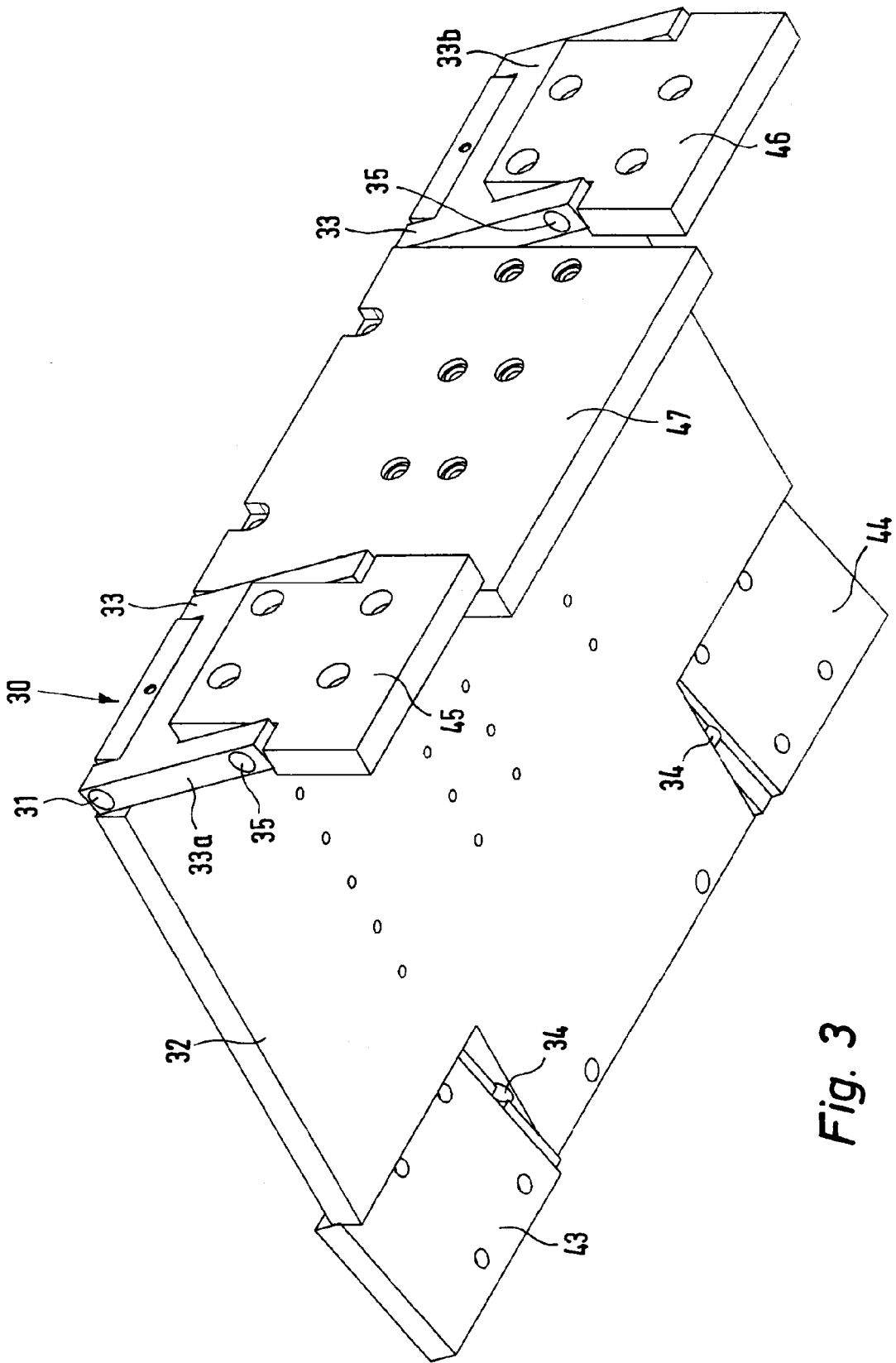
Figure 4:
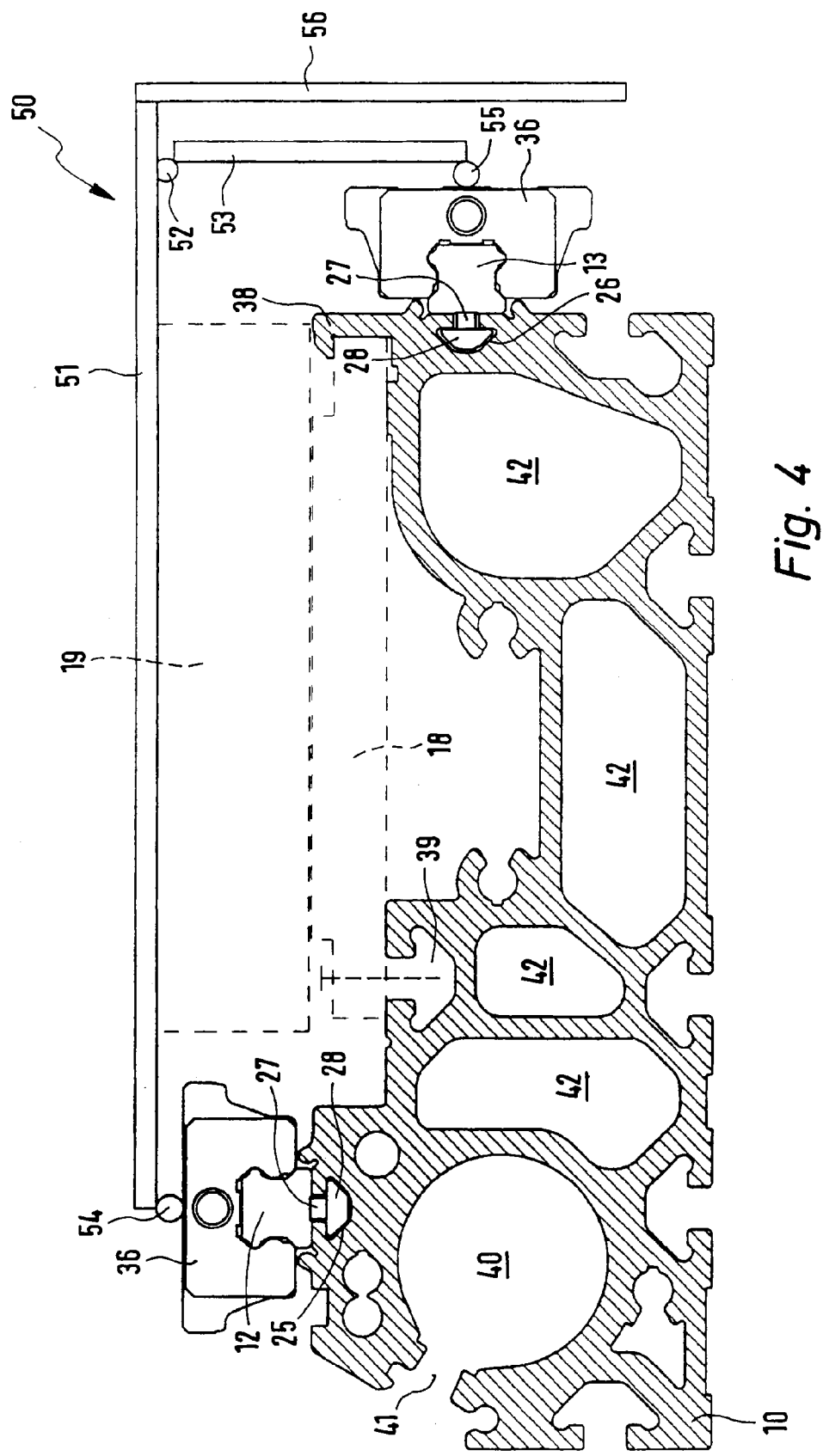

With articulated carriages, such as represented in FIGS. 2 to 4, an alignment and adjustment of the guide rails 12, 13 is not absolutely, or not at all, required. It is therefore also possible, for example, to employ guide rails fixedly connected with the stator, for example rolled on, welded on, soldered on, pressed on or glued on guide rails.

The carriage 30 represented in FIG. 2 has two carriage areas 32, 33, which are connected with each other via a hinge 31. In turn, these carriage areas 32, 33 are connected via hinges 34, 35 with guide elements 36 which, in the exemplary embodiment, are embodied as revolving ball guide elements, such as are known from DE 35 37 728 A1, for example. These guide elements 36 have a substantially U-shaped profile and extend with their legs around the guide rails 12, 13. In the center area, the guide rails 12, 13 have groove-like depressions 37 in their two oppositely located exteriors, which are engaged by the free end areas of the legs of the guide elements 36, so that they extend in a certain manner behind the guide rails 12, 13. This results in the guide elements 36 being able to move only in the longitudinal direction of the guide rails 12, 13, while all other movements in other directions are guided in a positive manner. Such an embodiment of the guide elements need not absolutely mean a design in the form of revolving ball guide elements, other types of guidance, such as a sliding guidance, are also possible instead.

The carriage areas 32, 33 are dimensioned in such a way that together they essentially again form an L-profile. The angle can slightly change as a result of heat expansion of the carriage 11, which during operation becomes heated to approximately 100° C. or more.

To keep heat expansion as low as possible, a material with a low coefficient of heat expansion is selected as the material for the carriage 30, and particularly for the carriage 11, for example steel, or a steel alloy, or a plastic material, such as carbon-reinforced fiber, or a compound material. In the case of the carriage 30, one of the carriage areas 32, 33 can also consist of steel or a steel alloy, and the other carriage area of carbon-reinforced fiber.

The top 14 of the stator 10 has a flat depression for receiving the permanent magnet arrangement 18. The latter has a pre-fabricated strip-shaped form and, for fixation in place on the stator 10, one of its longitudinal sides is pushed behind a strip-shaped holding protrusion 38 and, on the oppositely located longitudinal edge area, is screwed together with sliding blocks, not represented in detail, which can be inserted in an appropriately arranged longitudinal groove 39.

The drive coil arrangement 19 is mounted and maintained on the underside of the first carriage area 32, or respectively in accordance with FIG. 1, of the first carriage area 16. It is located at a small distance directly opposite the permanent magnet arrangement 18.

A circular-cylindrical connecting conduit 40 extends in the longitudinal direction through the profile of the stator 10. It is used for receiving a piston, not represented, for example a piston without a piston rod, and serves as a fluidic supplemental drive for the carriage 30, or respectively the carriage 11. Such a fluidic supplemental drive for an electrical linear drive device is known, for example, from EP 1404011 A1. In the present case, the piston is magnetically or mechanically coupled with the carriage 30, or respectively 11. For the mechanical coupling, the connecting conduit 40 has a slit 41, open toward the top, through which a mechanical connecting member, not represented, for the carriage extends through the carriage, while otherwise the carriage is sealed by means of a sealing strip, such as is represented and described in the cited prior art. The slit 41 is omitted in the case of a magnetic coupling.

A piston in the connecting conduit 40 can also be used for gravitation compensation. In this case the connecting conduit 40 is connected via one of the cover plates 22, 23 with a fluid volume 42, which also extends in the shape of linear channels within the profile of the stator 10. The volume in the connecting channel 40 is changed by the movement of the piston, while as a result of the connected fluid volume 42 only a small pressure difference respectively occurs. A pneumatic spring is constituted by this arrangement as a whole.

A fluidic supplemental drive or the fluidic return flow device are optional devices and are not absolutely required for the arrangement in accordance with the invention.

The carriage 30 is represented perspectively and in greater detail in FIG. 3. On its two corner areas remote from the second carriage area 33, the first carriage area 32 has holding plates 43, 44 for the hinged attachment of two guide elements 30, which are arranged, pivotable by means of the hinge 34, in appropriate cutouts.

The second carriage area 33, connected via the hinge 31 with the first carriage area 32, is made in two parts, wherein each partial area 33a and 33b has pivotable holding plates 45, 46 on its free end for the attachment of guide elements 36. The holding plates 45, 46 are here pivotably connected with the partial areas 33a and 33b via the hinge 35, designed to have two parts. A rigid mounting plate 47, connected at right angles with the first carriage area 32, is arranged between the partial areas 33a and 33b. The former can also be connected in one piece with the first carriage area 32.

In accordance with FIG. 3, four guide elements 36 can be attached to the carriage 30 at the four holding plates 43 to 46. In principle these could also only be three guide elements 36. In this case either a centered holding plate takes the place on the first carriage area 32 instead of the two holding plates 43, 44, or, in place of the holding plates 45, 46 one holding plate, centered on the second carriage area 33 embodied in one piece, which either extends over the entire width, or which is framed by two rigid mounting plates in the same plane.

A further embodiment of a carriage 50 is represented in FIG. 4. Here again, a first carriage area 51, which supports the drive coil arrangement 19, is connected via a hinge 52 with a second carriage area 53. Again in accordance with FIG. 2, the end areas, remote from the hinge 52, of these carriage areas 51, 53 are pivotably connected via hinges 54, 55 with guide elements 36. The hinged connections can be embodied in accordance with FIG. 3, for example. In contrast to FIG. 2, the first carriage area 51 is slightly overextended, while a mounting plate 56 is fixed in place at right angles and rigidly on the free end of the overextending area. Thus, this extends over the second carriage area 53 and the guide elements 36 attached thereto.

In this embodiment the first carriage area 51, together with the mounting plate 56, forms two mounting faces arranged at right angles in respect to each other, wherein this angle is always maintained independently of heat expansion. In the direction of movement, the mounting plate 56 always has the same extension as the first carriage area 51, and thus as the carriage 50 itself. In accordance with FIG. 2, the second carriage area 53 can be designed in two parts, or also as a single part wherein, with a single-part embodiment, the second carriage area 53 can have a length in the direction of movement which corresponds to that of the first carriage area 51, and can have one or two pivotable holding plates, or this second carriage area 53 is merely embodied in the form of a narrow plate or strip and arranged centered. In principle, in accordance with FIG. 3 the two partial areas 33a, 33b can also be embodied in the form of narrow strips or rods.

Figure 5:
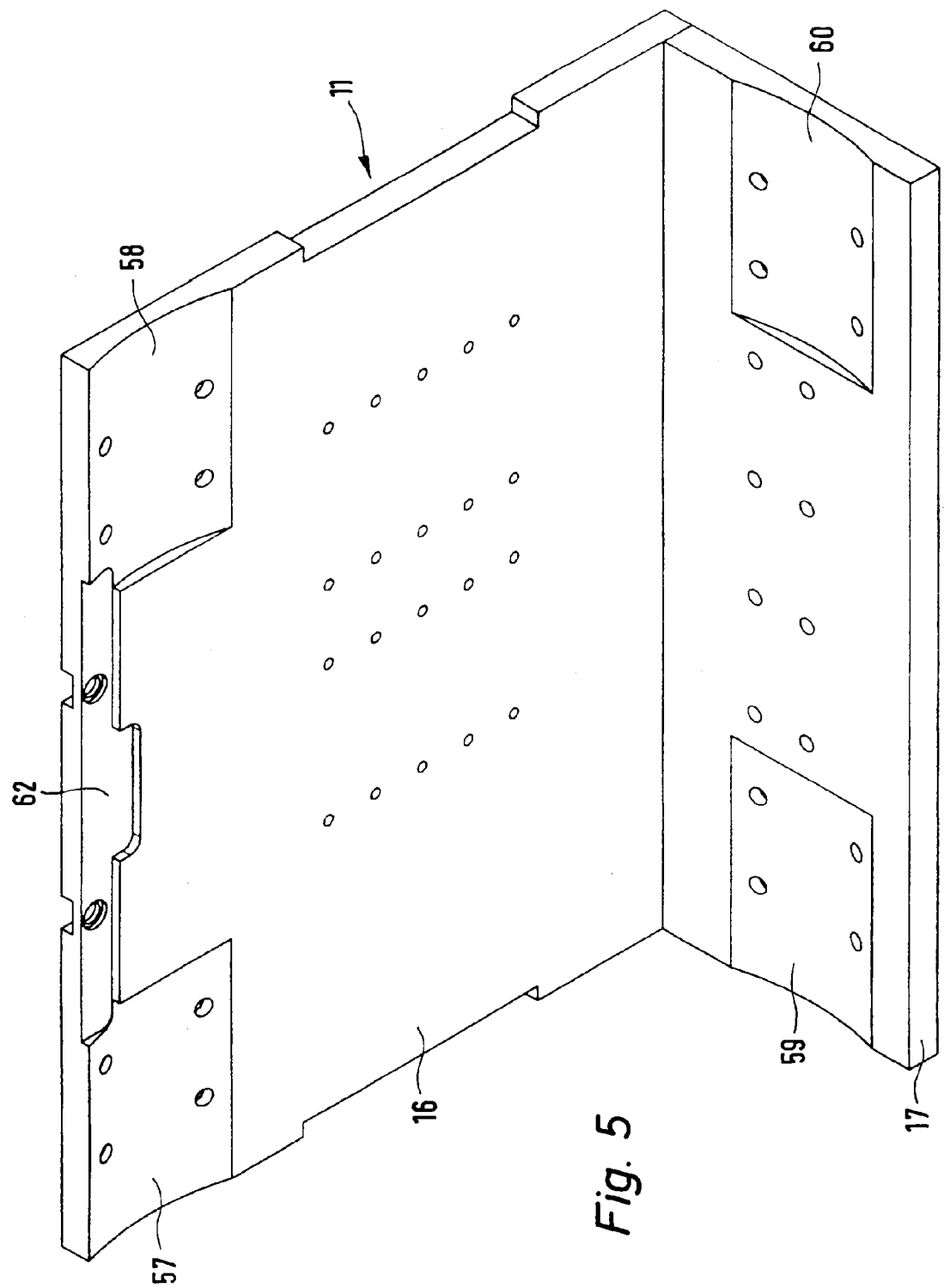
Figure 7:
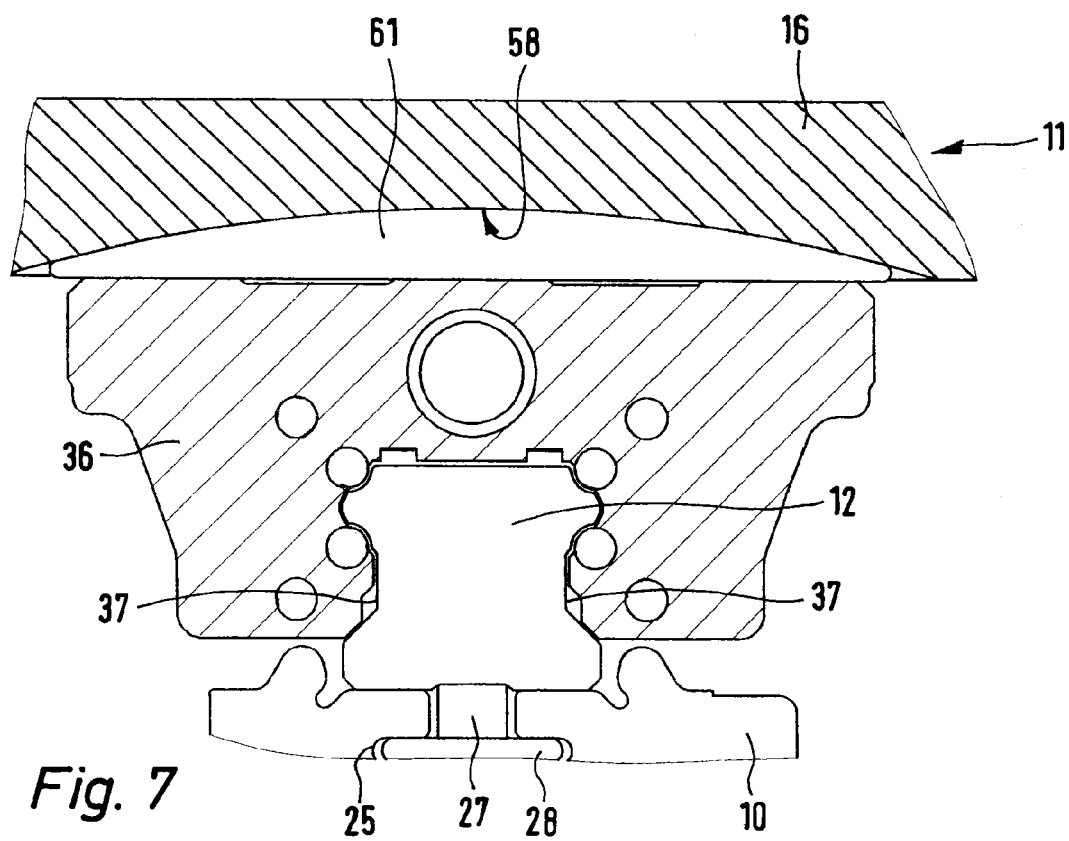

The rigid carriage 11 in accordance with FIG. 1 is represented in greater detail in FIG. 5. Four curved compensation recesses 57 to 60 for receiving guide elements in accordance with FIG. 7 are arranged on the insides of the two carriage areas 16, 17 facing the stator 10. On their sides facing the carriage, these guide elements 36 have correspondingly curved angle compensation elements 61, with which they are mounted in the compensation recesses 57 to 60, for example screwed or glued in. By means of this it is possible to compensate angular errors of the guide rails 12, 13, or respectively of the stator 10, as an additional compensation of the sliding blocks 28, which are arranged with play. The compensation recesses 57, 58 are arranged on the first carriage area 16 in the corner areas remote from the second carriage area 17, while the compensation recesses 59, 60 on the second carriage area 17 are also arranged in opposite edge areas, but substantially centered there.

Basically, an opposite arrangement is also possible, i.e. the guide elements 36 are provided with compensation recesses, while correspondingly curved angle compensation elements are attached to the carriage areas 16, 17.

A holding receptacle 62 for receiving a position measuring device is arranged between the compensation recesses 57, 58 in the first carriage area 16. For example, this can be embodied in a known manner as a device sensitive to magnetism, for example as a Hall sensor arrangement, which works together with a tape or lath arrangement on the stator 10 which is magnetized in the form of strips. Optical markings, which are appropriately optically scanned, can also take the place of magnetic markings.

In order to avoid experiencing problems of control technology in regard to position measuring because of a construction affected with play, the first carriage area 16, or respectively its holding receptacle 62, is rigidly connected with the measuring system and the drive coil arrangement 19 via the position measuring device. Because of this, possible axial play of the hinges does not present a problem.

The invention claimed is:

1. An electrical direct linear drive device, with a stator having two guide rails for the linear guidance of a driven carriage, wherein a permanent magnet arrangement providing the electrical drive and a drive coil arrangement that is movable relatively thereto, are provided, and wherein the guide rails are arranged on sides of the stator, wherein the two guide rails are differently oriented, and wherein the carriage extends at least partially over each one of said sides of the stator, and wherein guide elements having guide channels for the guide rails are arranged on the carriage.

2. The direct linear drive device in accordance with claim 1, wherein the carriage has a substantially L-shaped profile, and has two plate-shaped carriage areas that are arranged at right angles with each other.

3. The direct linear drive device in accordance with claim 2, wherein the carriage supports the drive coil arrangement on the stator on its side opposite the permanent magnet arrangement.

4. The direct linear drive device in accordance with claim 1, wherein the stator that is embodied in the form of a profiled extruded or cast part, has adjustable fixation means for the guide rails.

5. The direct linear drive device in accordance with claim 4, wherein the guide rails can be fixed in place in longitudinal grooves of the stator by means of adjustable sliding blocks.

6. The direct linear drive device in accordance with claim 1, wherein the carriage is conducted on the guide rails by means of at least two, guide elements that cooperate in a positively connected manner with the guide rails in a manner that only a relative movement in the linear direction of the guide rails is possible.

7. The direct linear drive device in accordance with claim 6, wherein the guide elements are embodied in the form of revolving ball guide elements.

8. The direct linear drive device in accordance with claim 1, wherein the guide elements are embodied so they can be fixed in place by means of curved angle compensating elements, or angle compensating areas, on correspondingly curved compensation surfaces or compensation recesses.

9. The direct linear drive device in accordance with claim 1, wherein the carriage has carriage areas that are connected with each other via a pivot shaft extending parallel with the guide rails and, to the guide rails, the guide elements themselves are hingedly attached.

10. The direct linear drive device in accordance with claim 9, wherein the carriage areas are embodied to be plate-shaped.

11. The direct linear drive device in accordance with claim 9, wherein the guide elements are fixed in place on holding elements, or holding plates, hingedly attached to the carriage areas.

12. The direct linear drive device in accordance with claim 9, wherein the carriage areas are substantially arranged at right angles with each other.

13. The direct linear drive device in accordance with claim 9, wherein the first carriage area that can be acted upon by the driving force, is rigidly connected with a plate-like mounting area that is arranged at right angles to it and extends over the second carriage area that is embodied to be of one or two pieces, or is arranged in essentially in the same plane with it.

14. The direct linear drive device in accordance with claim 1, wherein a position measuring device for scanning position markings arranged along the stator is also arranged on the carriage.

15. The direct linear drive device in accordance with claim 1, wherein a linear channel through the stator contains a piston, which is mechanically or magnetically connected with the carriage.

16. The direct linear drive device in accordance with claim 15, wherein the piston is designed as a drive piston or gravitation-compensating device.

17. The direct linear drive device in accordance with claim 1, wherein the carriage consists of steel, or a steel alloy, and/or of carbon-reinforced fiber.

* * * * *